United States Patent
Guzman

(10) Patent No.: US 6,962,033 B2
(45) Date of Patent: Nov. 8, 2005

(54) AUTOMATIC HIGH SPEED WRAPPING MACHINE

(75) Inventor: Foster Guzman, Downey, CA (US)

(73) Assignee: Belco Packaging Systems, Inc., Monrovia, CA (US)

(*) Notice: Subject to any disclaimer, the term of this patent is extended or adjusted under 35 U.S.C. 154(b) by 0 days.

(21) Appl. No.: 10/465,989

(22) PCT Filed: Dec. 28, 2001

(86) PCT No.: PCT/US01/49599
§ 371 (c)(1),
(2), (4) Date: Jan. 30, 2004

(87) PCT Pub. No.: WO02/053457
PCT Pub. Date: Jul. 11, 2002

(65) Prior Publication Data
US 2004/0128957 A1 Jul. 8, 2004

Related U.S. Application Data

(63) Continuation-in-part of application No. 09/752,784, filed on Dec. 28, 2000, now abandoned, and a continuation-in-part of application No. 09/960,839, filed on Sep. 21, 2001, now abandoned, and a continuation-in-part of application No. 10/061,368, filed on Oct. 19, 2001, now abandoned.

(51) Int. Cl.[7] .............................. B65B 57/02; B65B 9/06
(52) U.S. Cl. ................... 53/55; 53/74; 53/550; 53/568; 53/373.5; 53/374.3; 53/374.6
(58) Field of Search ............................. 53/55, 74, 500, 53/550, 557, 562, 568, 373.4, 373.5, 374.5, 374.6, 375.4

(56) References Cited

U.S. PATENT DOCUMENTS

| | | | |
|---|---|---|---|
| 3,633,333 A | * | 1/1972 | Schlemmer et al. ....... 53/373.4 |
| 4,035,983 A | | 7/1977 | Shanklin et al. |
| 4,185,443 A | | 1/1980 | Budzyn |
| 4,219,988 A | * | 9/1980 | Shanklin et al. ............... 53/550 |
| 4,430,845 A | | 2/1984 | Dohrendorf |
| 4,490,961 A | * | 1/1985 | Raque ....................... 53/374.5 |
| 4,494,362 A | | 1/1985 | Koch |
| 4,608,797 A | | 9/1986 | Shabram, Jr. et al. |
| 5,165,221 A | | 11/1992 | Udelson et al. |
| 5,271,210 A | * | 12/1993 | Tolson .......................... 53/550 |
| 5,371,999 A | * | 12/1994 | Hansen et al. ............. 53/374.6 |
| 5,385,004 A | * | 1/1995 | Tolson .......................... 53/550 |
| 5,444,964 A | * | 8/1995 | Hanagata ...................... 53/550 |
| 5,603,801 A | * | 2/1997 | DeFriese et al. ........... 53/373.5 |
| 5,653,085 A | * | 8/1997 | DeFriese et al. .............. 53/550 |

(Continued)

FOREIGN PATENT DOCUMENTS

| | | | | |
|---|---|---|---|---|
| JP | 6-99913 | * | 4/1994 | ................. 53/374.4 |
| WO | WO 93/07058 | * | 4/1993 | ............. B65B/9/08 |

*Primary Examiner*—Stephen F. Gerrity
(74) *Attorney, Agent, or Firm*—Christie, Parker & Hale, LLP

(57) ABSTRACT

An automatic high speed packaging machine for wrapping packages in polymer film is disclosed wherein the film seal at the sides and ends of the packages is made at a high rate of speed as the packages travel through the machine. The packages travel continuously in a straight line through the machine. The packages are delivered at the input end of the machine by an in-feed conveyor into a film inverting head where the packages are surrounded by longitudinally half-folded polymer film. Thereafter, the packages are transported to a side sealing mechanism which forms a longitudinal seal in the film on the side opposite the fold. Finally, the packages are transported to a traveling end seal mechanism where a lateral seal is formed at each end of the package and the film web connecting succeeding packages is severed. The machine produces packages which have a sealed film wrap around the entire package. If desired, the polymer film may be of a heat shrinkable variety and the sealed package may be passed through a shrinking oven to produce a package having a tight "shrinkwrap" film covering.

18 Claims, 10 Drawing Sheets

U.S. PATENT DOCUMENTS

| | | | | |
|---|---|---|---|---|
| 5,675,958 A | * | 10/1997 | Shanklin et al. | 53/374.6 |
| 5,771,660 A | * | 6/1998 | Loewenthal | 53/374.5 |
| 5,904,027 A | * | 5/1999 | Bonde | 53/374.5 |
| 5,956,931 A | * | 9/1999 | Stork | 53/550 |
| 6,050,065 A | * | 4/2000 | Bonde | 53/550 |
| 6,088,994 A | * | 7/2000 | Nakagawa et al. | 53/552 |
| 6,178,726 B1 | * | 1/2001 | Takigawa | 53/551 |

* cited by examiner

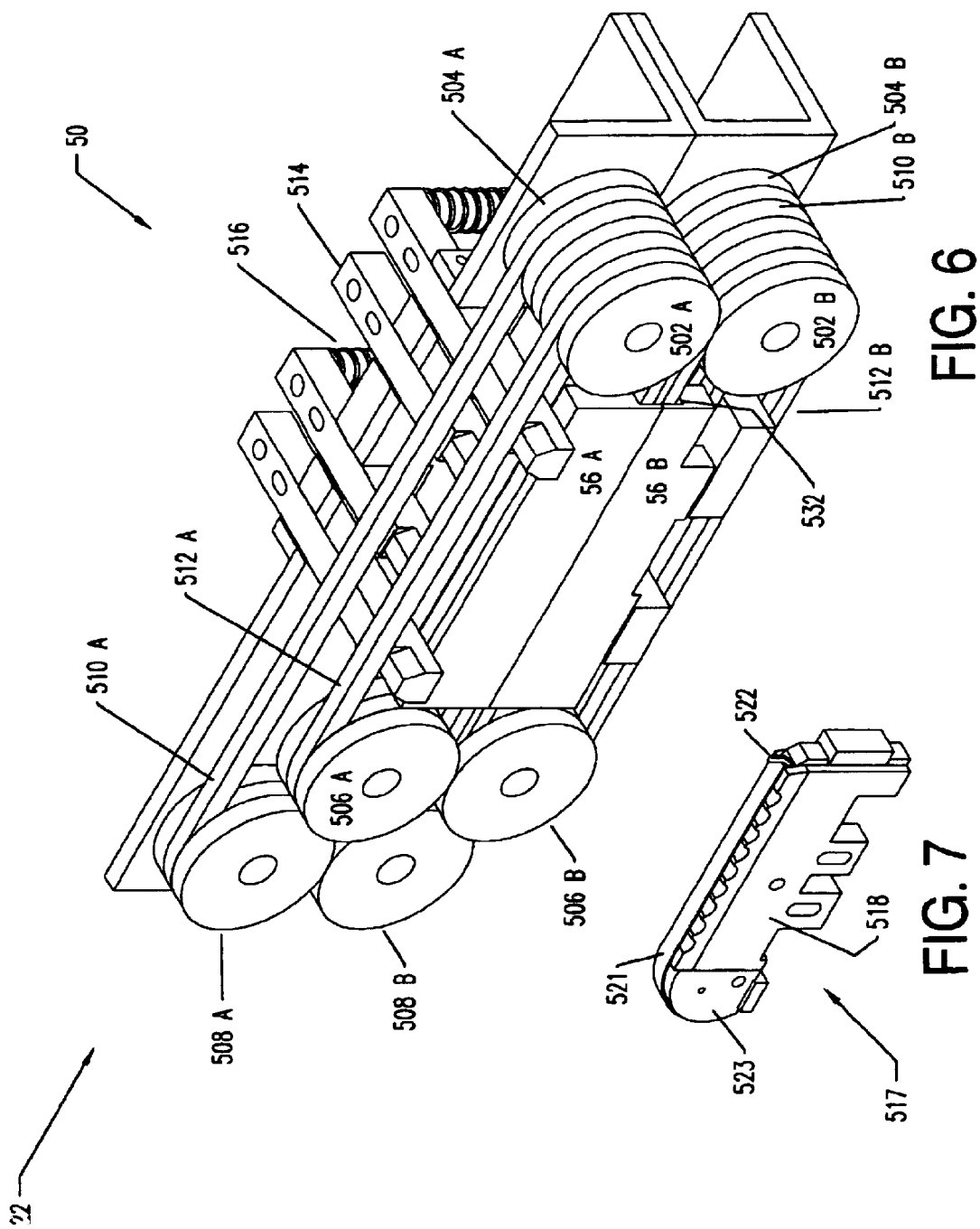

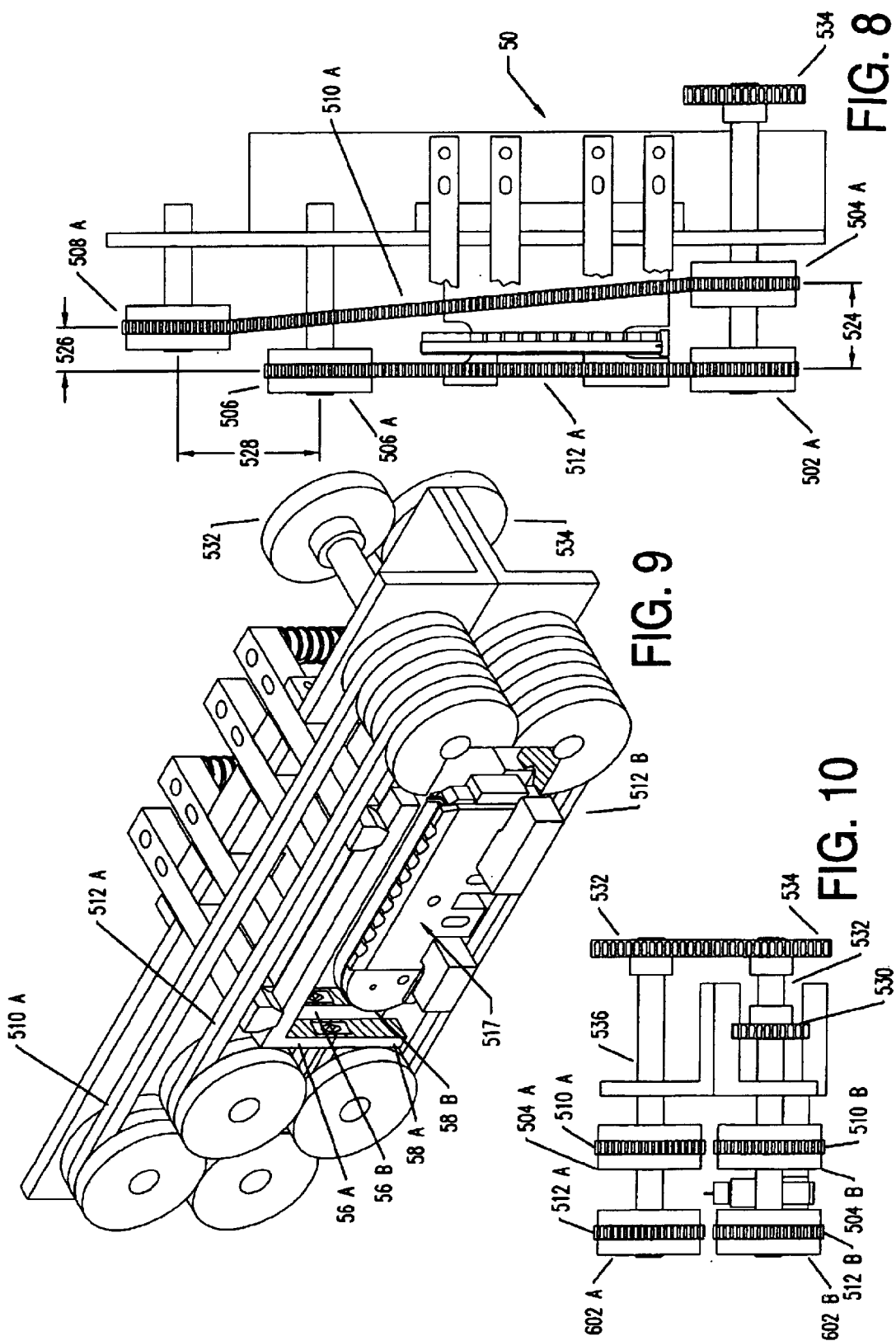

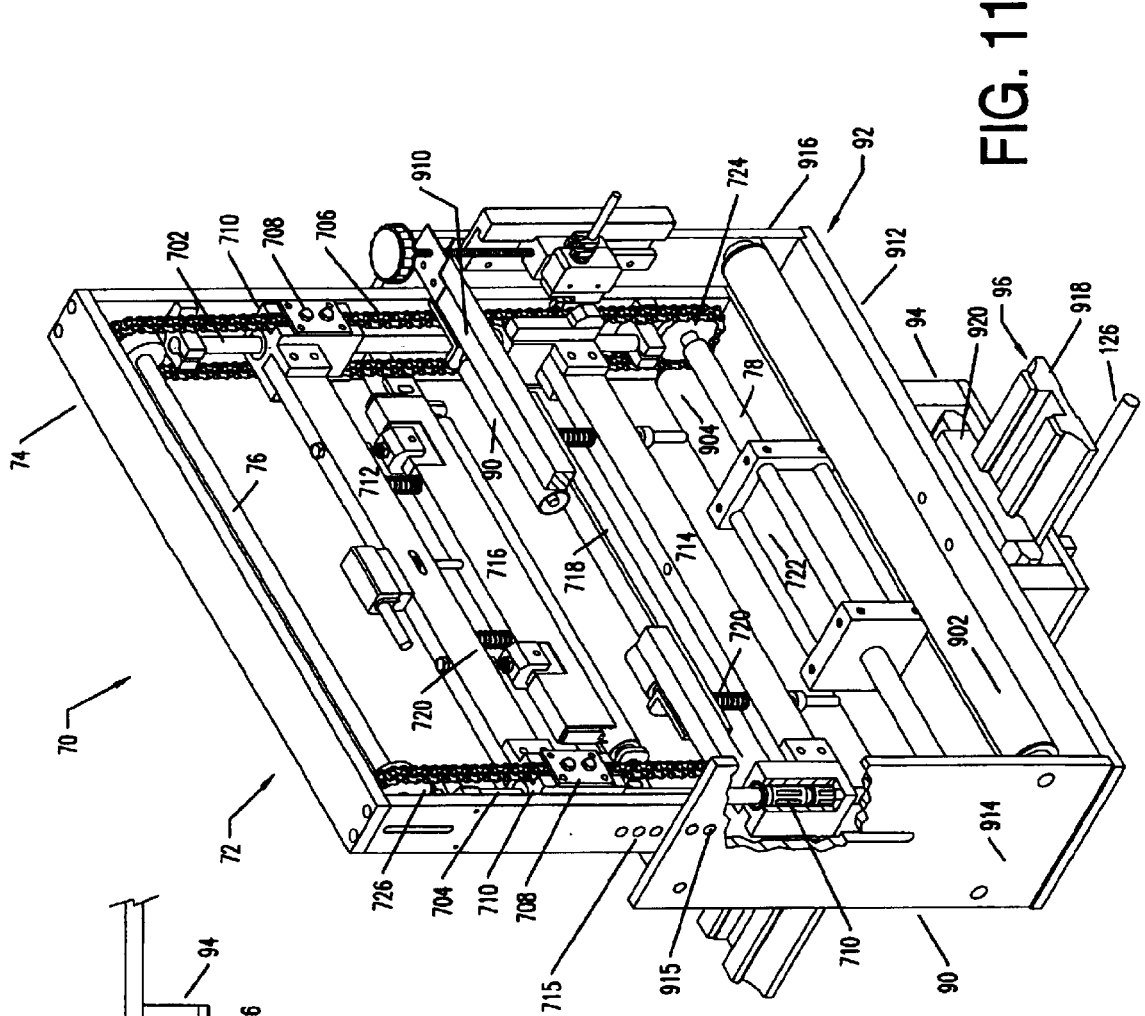
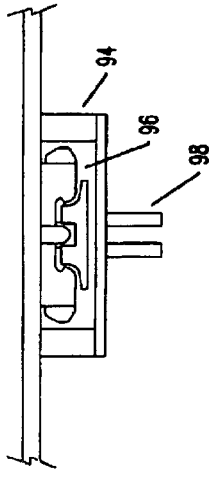
FIG. 11
FIG. 12

AUTOMATIC HIGH SPEED WRAPPING MACHINE

CROSS-REFERENCE TO RELATED APPLICATION

This application is a National Stage filing under 35 U.S.C. §371 of International Application No. PCT/US01/49599, which has an International filing date of Dec. 28, 2001 and which designated the United States of America, which is a continuation-in-part of application Ser. No. 09/752,784 filed Dec. 28, 2000 (now abandoned), and is a continuation-in-part of application Ser. No. 09/960,839 filed Sep. 21, 2001 (now abandoned), and is a continuation-in-part of application Ser. No. 10/061,368 filed Oct. 19, 2001 (now abandoned), the contents of which are incorporated fully by reference herein.

BACKGROUND OF THE INVENTION

This invention relates to automatic package wrapping machines and in particular to a machine which wraps packages in polymer film, including heat shrinkable thermoplastic film, and seals the edges of the film to completely encase the packages within the film where the packages move continuously at a high rate of speed through the machine.

In typical prior art bagging and in-line shrink wrap packaging machines, packages are moved towards a cutting and sealing area by an in-feed conveyor. As the packages are moved towards the cutting and sealing area, the packages are surrounded by center folded polymer or shrink wrap film that has been partially unfolded so that the packages may be conveyed between the film layers. Subsequently, the packages are transferred to an exit conveyor where the packages move to a designated sealing and cutting location. At the sealing and cutting location, it is typical to stop the forward movement of the exit conveyor and use a hot knife or hot wire system to longitudinally and laterally seal the layers of polymer film and to sever the film between adjacent packages at the lateral or cross seal. The end result of the cutting and sealing operations are packages that are securely enclosed or "bagged" within polymer film. After the packages are bagged, the exit conveyor is again activated and the packages are typically either packed for shipping or are further conveyed to a shrink wrap tunnel or oven, where the film is heated causing it to shrink over the packages thereby securely wrapping the packages.

One typical prior art machine, commonly referred to as an L-sealer, is described in U.S. Pat. No. 3,583,888, issued to Shanklin, entitled "Packaging Wrapping Apparatus and Method." An L-sealer uses an L-shaped hot knife to contemporaneously cross-seal and side seal the layers of polymer film when the package is stopped at the cutting and sealing location. L-shaped hot knives are typically coated with TEFLON, so that melted polymer film will not stick to the knife. An advantage of L-sealers is that the packages they make are neat and attractive having trim seals on three sides and clear film on the fourth side and top and bottom. L-sealers, however, have several disadvantages. The dimensions of L-shaped hot knives must be larger than the size of the packages being wrapped. Thus, L-sealers cannot produce longitudinal seals longer than the length of the knife. In addition, it is important that a TEFLON coated hot knife be extremely straight and without nicks. If the knife is improperly adjusted, warped, or nicked, polymer film will not seal properly. For instance, a nick in the knife will create a hole in the seal. Likewise, a warped or improperly adjusted knife will create an incomplete seal.

More recent machines have overcome some of the limitations of L-sealers by using continuous longitudinal or side sealers. These machines have utilized hot wires and ultrasonic welders to create a continuous side seal. However, most of these machines have used a straight hot knife for cross sealing and require the conveyer system to be stopped while the hot knife makes the cross seal. Thus, these machines still suffer from the intermittent operation typical of L-sealer type machines and therefore have the same limitations regarding package throughput.

Efforts have also been made with rotary hot knife systems that can cut and side seal polymer film without stopping the forward movement of the film. Such rotary hot knife side sealing systems typically have a circular TEFLON coated knife mounted for rotation. However, these systems are typically not compatible with some of the thicker polymer films commonly used in high speed applications because of insufficient contact time between the film and the rotary knife to produce suitable welds.

What is needed therefore is a high speed package wrapping machine capable of continuous operation during both side and cross sealing functions. The machine should be readily adaptable for use with a wide range of package sizes without requiring the need to replace hot knives or other hardware to accommodate different size packages. Such a machine would thus be simpler and have a quicker setup time than existing machines. Ideally, such a machine would utilize a sealing mechanism that improves on existing hot knife, hot wire, and ultrasonic sealing devices.

SUMMARY OF THE INVENTION

The high speed wrapping machine of the present invention solves many of the above mentioned problems by providing an in-line wrapping machine capable of wrapping a wide range of package sizes through simple on-machine adjustments. The machine is capable of continuously wrapping packages at film velocities of 65 feet per minute. The machine includes a powered film dispenser, an in-feed conveyor, a film inverter, a side sealer and conveyor, and a traveling end sealer and conveyor.

Packages enter the machine on the in-line, in-feed conveyor. Center-folded film is fed from a powered film dispenser mounted at the rear of the machine and passes over the adjustable film inverting head. The inverting head turns the film inside out, leaving an opening into which packages maybe inserted. The in-feed convey or carries packages through the film inverting head where they are wrapped with polymer film. As the product is conveyed onto the side seal conveyor, a side sealer equipped with a hot tapered drag wire, and a hot post cutoff, begins the process of drawing the film through the sealer at about the same rate as packages advance on the conveyor. This permits light and heavy films to be fed through the machine without distorting the film. The side sealer makes a continuous seal and trims the selvage off the packages creating a sealed tube as the film advances through the machine. The side sealer is driven by a main drive motor via a power-take-off shaft which also drives the side seal conveyor. This provides for smooth package and film travel at various speeds. The horizontal package carrying surfaces of the in-feed conveyor, the side seal conveyor, and the traveling end seal conveyor are mounted at the same elevation to ensure that packages are carried smoothly through the machine.

Since the machine uses a continuous side sealer, package length is not limited by the length of the sealing system, and packages of very long lengths can be wrapped if supported by conveyors. As a package progresses further through the machine, a traveling end seal mechanism seals the trailing edge of the package and simultaneously seals the leading edge of the next package traveling through the machine. The traveling end sealer is equipped with a photocell trigger such that as a package breaks the photocell beam, a unique combination of linear and rotary air cylinders, in combination with a partial revolution clutch, a variable speed transmission, and other drive components, causes the sealing jaws to close, while simultaneously, the end sealer moves forward longitudinally on a traveling carriage assembly. The carriage assembly reciprocates back and forth along one or more linear bearings. At the end of the carriage's travel the sealing jaws open and the carriage returns to its initial or rest position. The machine includes a discharge conveyor which utilizes a single belt which extends through the traveling end sealer to the end of the machine. Generally, the traveling end sealer moves longitudinally at about the same speed as the packages. However, the traveling carriage assembly's speed maybe independently controlled by means of the variable speed transmission incorporated in the drive system.

Other features and advantages of the invention will become more apparent from the following detailed description of the invention, when taken in conjunction with the accompanying exemplary drawings.

BRIEF DESCRIPTION OF THE DRAWINGS

FIG. 6 is a perspective view of the side sealing mechanism of the present invention.

FIG. 7 is a perspective view of the sealing jaw which forms part of the sealing mechanism.

FIG. 8 is a top view of the side sealing mechanism of FIG. 7 showing the offset and horizontal spacing of the film feed pulleys of the side seal unit.

FIG. 9 is a perspective view of the side sealing mechanism of the present invention, partially cutaway to reveal internal details.

FIG. 10 is a side view of the side sealing mechanism shown in FIG. 9.

FIG. 11 is a perspective view of the traveling end seal mechanism of the machine of FIG. 1.

FIG. 12 is a front view of a portion of the traveling end seal mechanism shown in FIG. 11.

Figure 13:
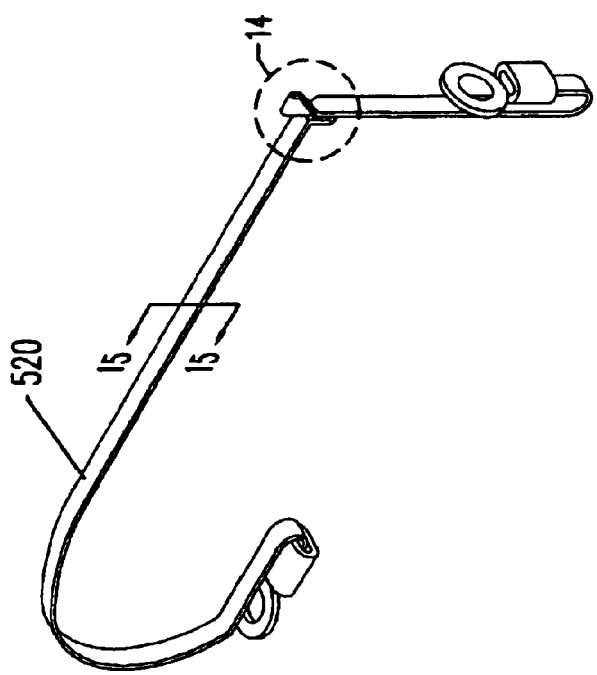
FIG. 13 is a perspective view of hot drag wire shown in FIG. 7.

FIG; 14 is an enlarged view of Detail 14 shown in FIG. 13.

Figure 15:
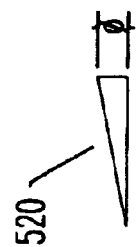

FIG. 15 is a sectional view taken along the line 15—15 as shown in FIG. 13, showing the cross section of the tapered drag wire.

DETAILED DESCRIPTION OF THE PREFERRED EMBODIMENTS

Figure 1:
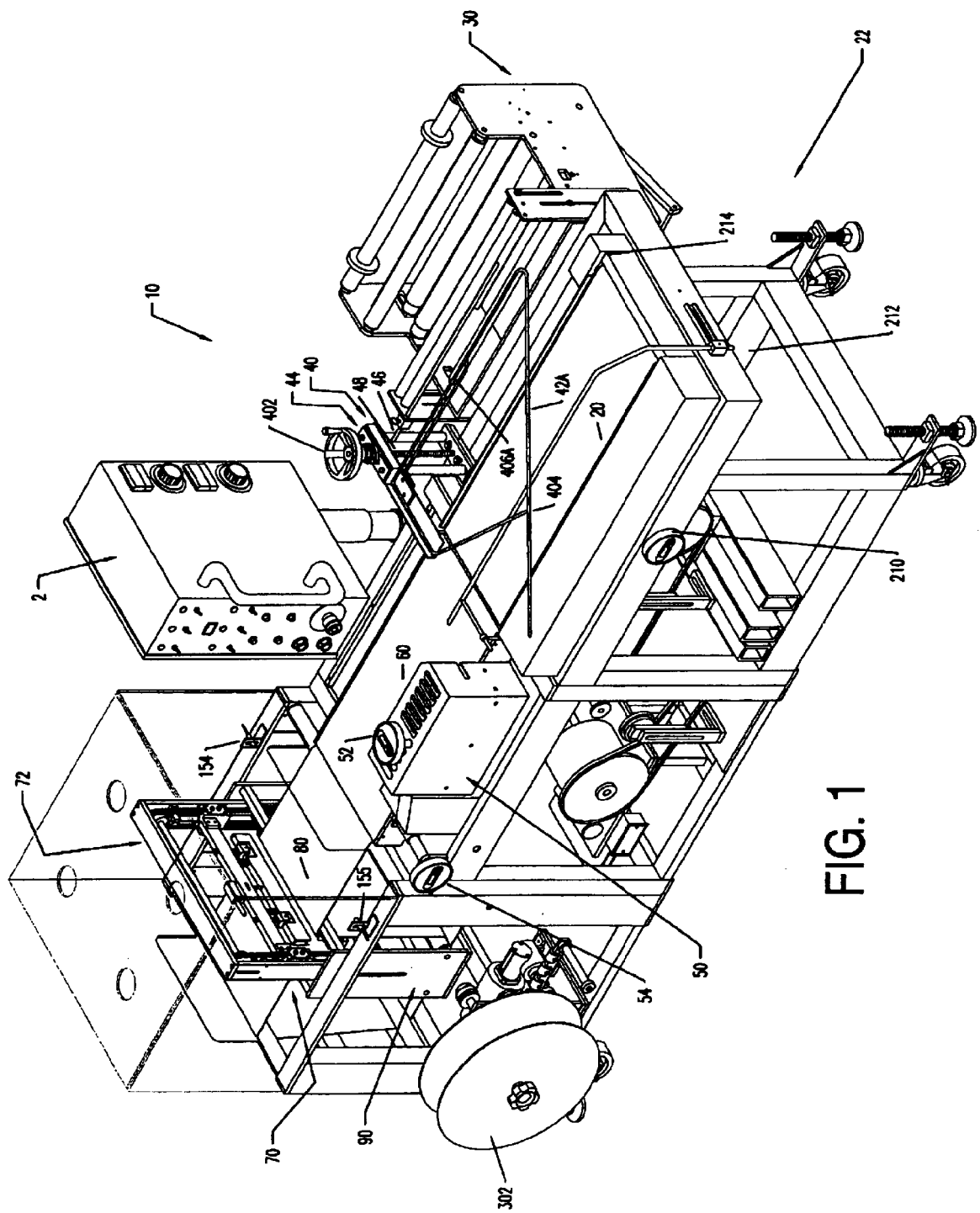
FIG. 1 is a perspective view, from the front, of a high speed film wrapping machine in accordance with the present invention.
Figure 2:
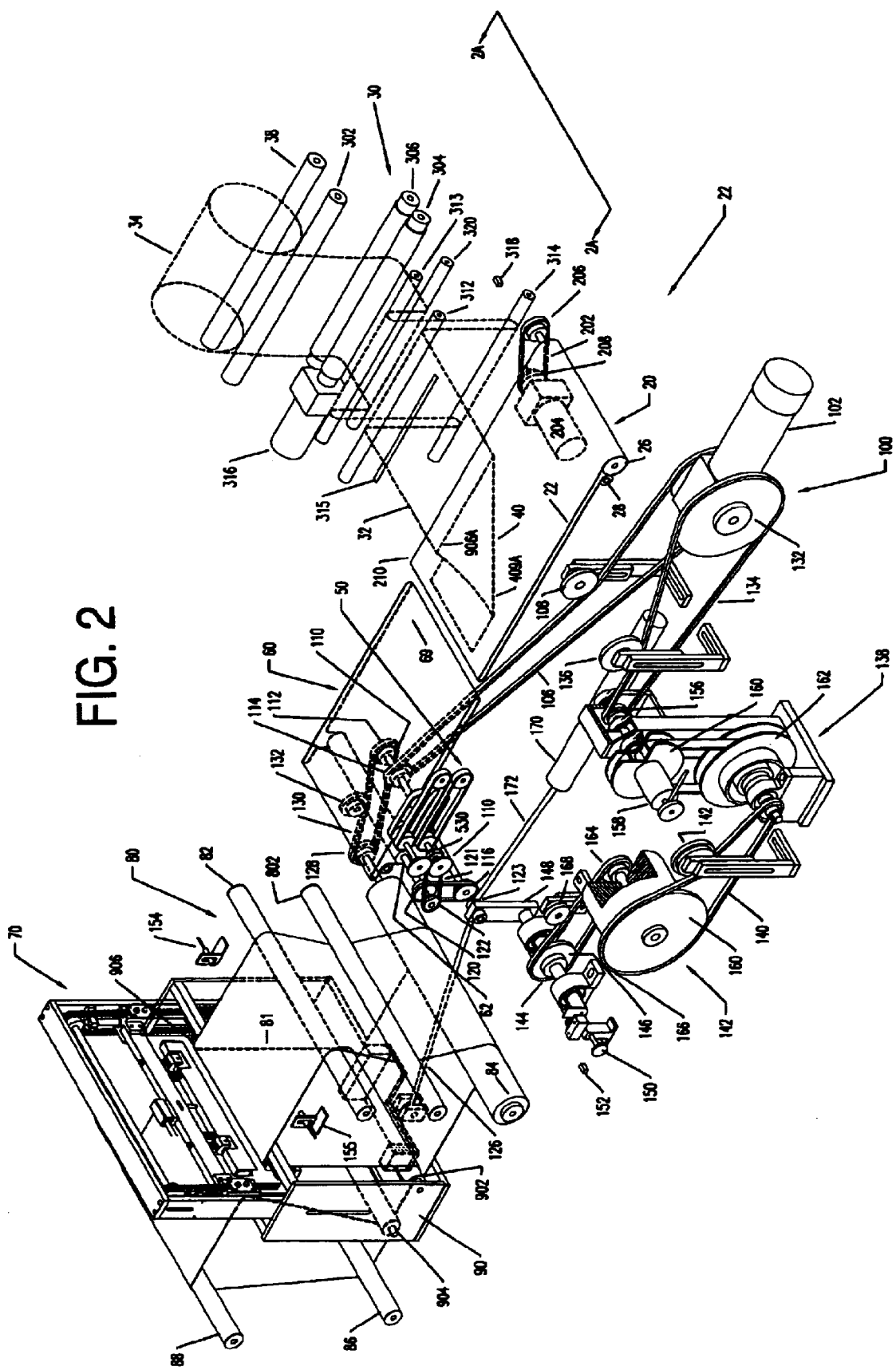
FIG. 2 is a perspective view of the high speed film wrapping machine shown in FIG. 1, with the traveling end seal mechanism and associated coveyor assembly of the machine longitudinally separated from other subassemblies for clarity, with the supporting structure removed to expose the details of the invention.

FIGS. 1 and 2, show perspective views of the high speed wrapping machine of the present invention, generally designated 10. Designated generally, the machine comprises an in-feed conveyor 20, a film dispenser 30, an inverting head 40, a side sealer 50, a side seal conveyor 60, a traveling end sealer 70, an end seal conveyor unit 80, a control panel 2, and a power transmission system 100.

Referring now to FIGS. 1–2 and 4–5, a general overview of the functioning of the high speed wrapping machine of the present invention is as follows. The machine 10 wraps a package ("P") in a flexible polymer film 32 in which the direction of package flow through the machine is essentially continuous and in a straight line. The film is supplied to the machine as a center folded web at right angles to the direction 22 of flow of the packages (best shown in FIG. 4) through the machine. The film is provided to the inverting head 40 where the film is redirected and turned inside out to provide film traveling in the same direction as the packages delivered by the in-feed conveyor 20. The in-feed conveyor 20 pulls the packages (P6) into the inverting head 40 to cause them to be enclosed by the folded film 32 supplied by the film dispenser 30 on the top, and on one side of each package with the other side of each package adjacent to the edges of the folded film. The packages (P5) thus enclosed in the web of film pass from the in-feed conveyor to the side seal conveyor 60, where a speed differential between the two conveyors uniformly spaces the packages on the side seal conveyor. The speed differential and thus the spacing between packages is adjustable by the machine's operator. As the packages pass the side sealer 50, the two free edges of the folded film are sealed to form the continuous tube of film 36 which envelopes the succession of packages which are being fed into the machine by the in-feed conveyor (P4 and P5). The side sealer also severs the excess width of film from the tube and this scrap film 38 is removed by the take-up wheel assembly 302. As the packages progress further through the machine, the traveling end sealer 70 seals the trailing edge of each package while simultaneously sealing the leading edge of the succeeding package in the machine 10 (P2). During the sealing operation, the end sealer also severs one package from another while the packages are traveling without stopping the machine. The end seal mechanism is designed so that it travels a short distance with a package at substantially the same velocity as the package for the duration of time required to make the seal. After the seal has been made, the end seal mechanism releases from the film and returns to its original position to repeat the end seal for the next package. The wrapped package may optionally then be conveyed through a shrink tunnel (shown schematically in FIG. 5) if shrinking of the film around the package is desired (P1). The component parts and assembly of the high speed wrapping machine will now be discussed in detail.

In-Feed Conveyor

Figure 3:
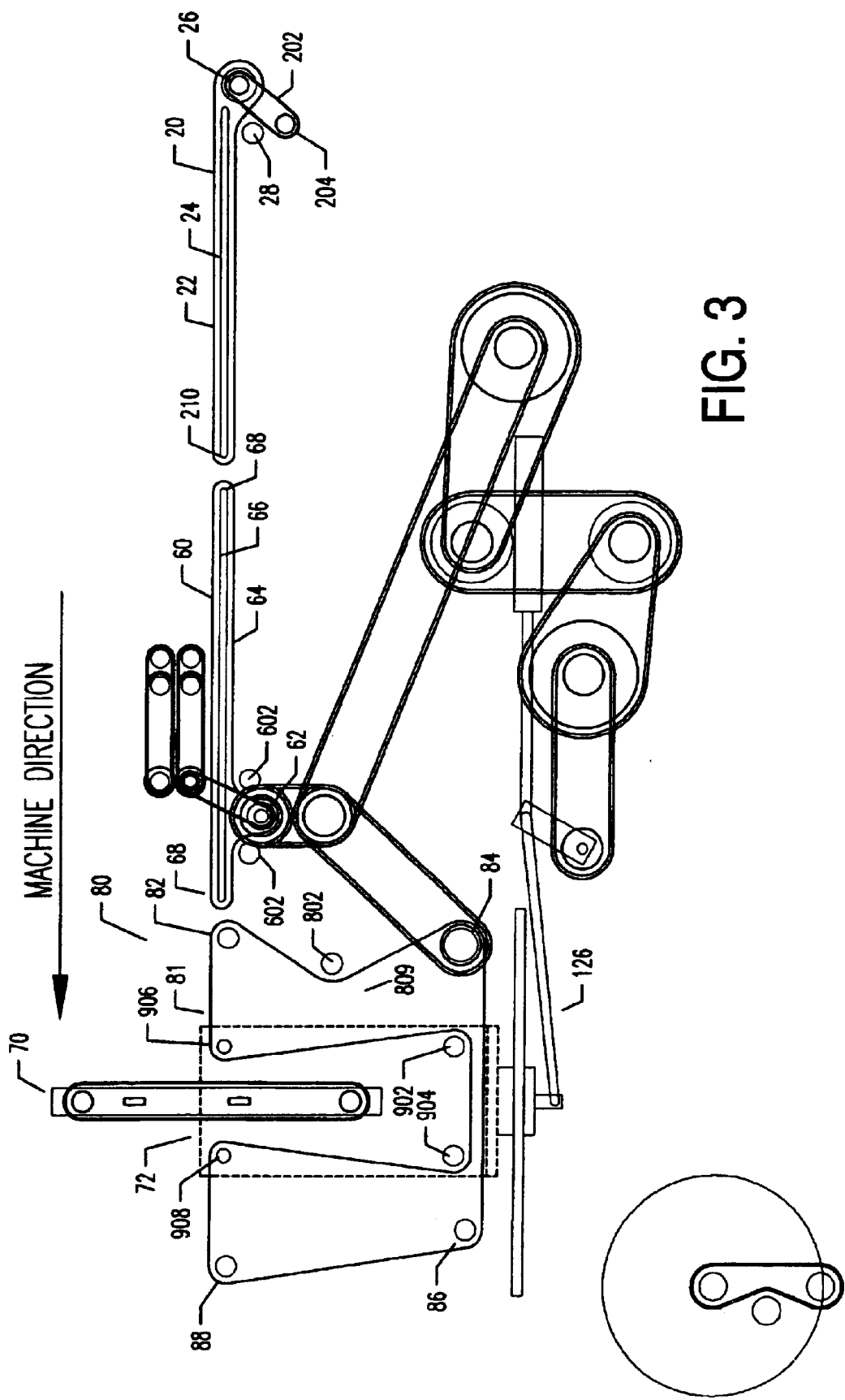
FIG. 3 is a schematic of the power transmission for the entire system for the entire machine shown in FIG. 1.
Figure 4:
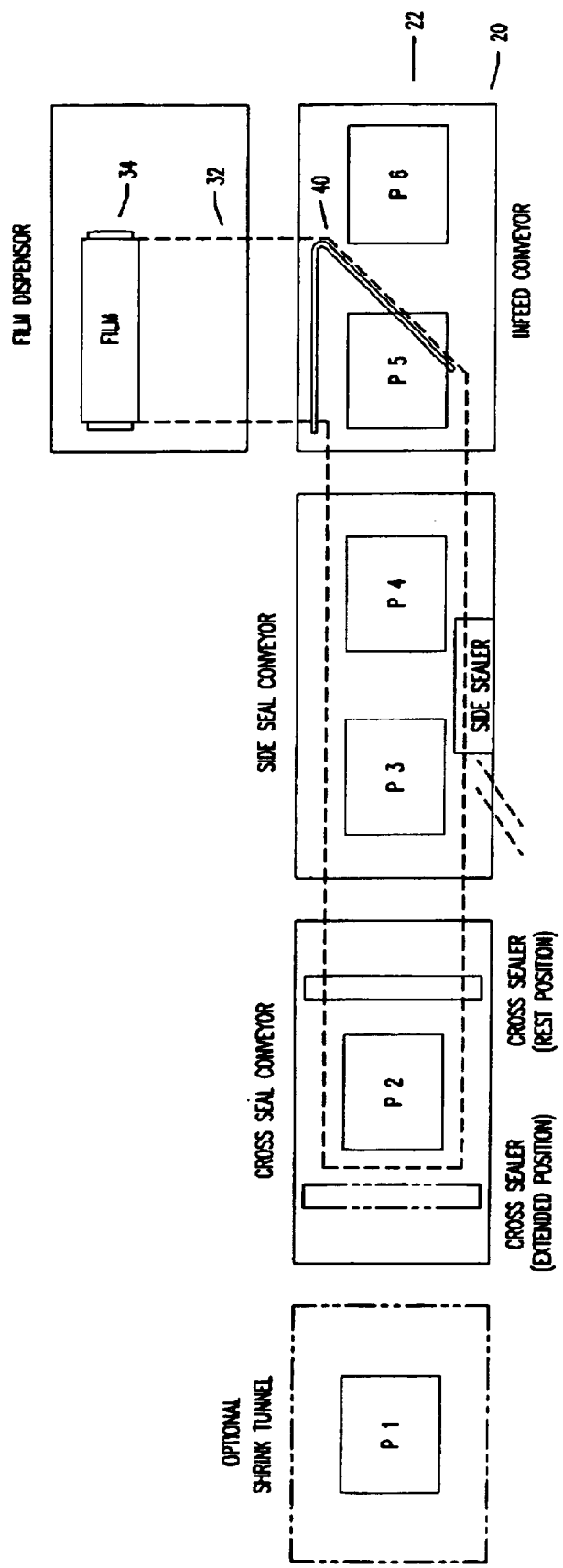
FIG. 4 is a top view of the machine of FIG. 1 showing the packages as they travel through the machine.

Referring now to FIGS. 2 and 3, as stated earlier, the in-feed conveyor 20 feeds packages into the machine 10. The in-feed conveyor comprises an endless belt 22 and a conveyor plate 24. At one end of the conveyer plate is a drive roller 26 and an idler or tension roller 28. At the conveyor plate's opposite end, the plate has a rounded nosepiece 210, which is used in place of a more conventional idler roller. The drive roller is connected to a motor 204 by means of a pulley and belt arrangement, where a pulley 208 is connected to the motor output shaft and a pulley 206 is connected to the drive roller and the two pulleys are coupled by a drive belt 202. In operation, the endless belt 22 is fitted over the drive roller, idler roller, and conveyor plate. Belt slack is taken up by the idler roller which may be equipped with a biasing feature for automatic belt tension adjustment. Methods of tensioning idler rollers are well known to those skilled in the art.

By the arrangement described above, the in-feed conveyor is driven at a constant speed. The speed of the motor 204 is electrically controlled by means of the control panel 2. Control of the in-feed drive motor is electrically coupled to that of the main drive system (to be described). The control logic includes the ability to maintain a speed differential between the in-feed conveyor and the side seal conveyor 60 as the overall system speed is increased or decreased. Typically, the speed of the in-feed drive motor is less than that of side seal conveyor. In general, the slower the in-feed conveyor runs in comparison to the side seal conveyor, the greater will be the spacing between packages. If the in-feed conveyor is run at a speed close to that of the side seal conveyor the spacing between packages will be quite small. The in-feed/side seal conveyor speed differential is easily controlled by the machine's operator and the subsequent package spacing may be visually verified.

Referring now to FIG. 1, the in-feed conveyor further includes package guides 212 and 214, where guide 214 is a fixed guide, and guide 212 is laterally movable with respect to the fixed guide. The guides allow the machine 10 to be readily adjusted to accommodate packages of varying widths. In addition, the lateral position of the in-feed conveyor is adjustable with respect to the side seal conveyor. In the exemplary embodiment, the in-feed conveyor is laterally adjustable by rotating a control wheel 210. The lateral adjustment mechanism (not shown) may comprise screw leads, ball slides, or any other suitable adjustment mechanism.

Film Inverter

With reference to FIGS. 1 and 2, the film inverter 40 of the present invention comprises a first movable triangular inverting head 42A which is positioned above the in-feed conveyor, a second fixed triangular inverting head 42B (not shown) which is positioned below the in-feed conveyor. The first inverting head is attached to a vertical inverting head adjustment assembly 44 which serves to raise or lower the first inverting head in order to accommodate packages of various heights. The present embodiment of the vertical inverting head adjustment assembly comprises a screw lead 48 which is driven by an adjustment wheel 402 and is guided by twin linear guides 46. This embodiment is meant to be exemplary only. Those skilled in the art will recognize that alternative means of accomplishing the vertical adjustment of the inverting head are possible.

For the most efficient operation, elements 404A and 404B of the upper and lower inverting heads respectively should be substantially at an angle of 45 degrees with respect to the direction of package flow 22. Also elements 406A and 406B of the upper and lower inverting heads should be at substantially right angles to the flow of film 32 from the film dispenser 30.

In operation, one side of the center-folded film 32 from the film dispenser 30 passes under the in-feed conveyor to the lower inverting head 42B and one side of the film passes over the in-feed conveyor to the upper inverting head 42A. As the in-feed conveyor pulls the package through the inverter a top layer of film covers the packages. The bottom layer of film is threaded from under the in-feed conveyor to the top of the side seal conveyor 60. Thus, as each package emerges from the film inverting assembly 40, and crosses to the side seal conveyor 60 there is a layer of film over the top of the package and a layer between the bottom of each package and the side seal conveyor. On the side of each package facing the film inverter or opposite the side sealer 50, the film is unbroken around the package. On the side of each package facing the side sealer the free edges of the upper and lower layers of center-folded film rest on top of each other.

Powered Film Dispenser

Figure 2A:
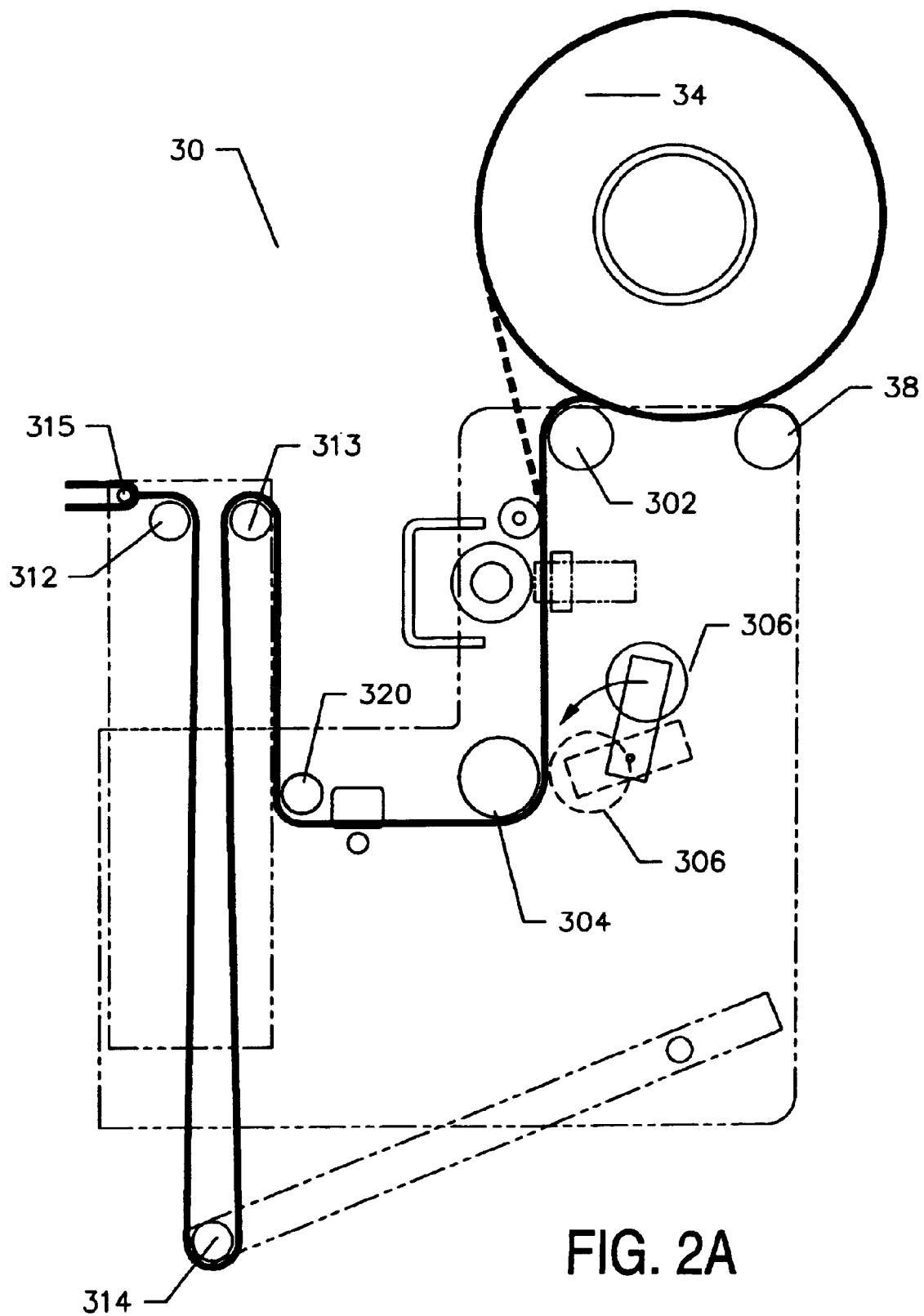
FIG. 2A is a view, in schematic form, taken along the line 2A—2A, as shown in FIG. 2, of a film inverter according to the present invention.

Referring now to FIGS. 2 and 2A, the wrapping machine 10 of the present invention uses center-folded film 32 from the roll of film 34 supplied by the powered film unwind or dispenser 30. In the present embodiment, a powered film unwind system is used where a slight tension on the film web 32 raises a dancer roller 314 which in turn activates and rotates a potentiometer 318, which drives a motor 316, which drives a drive roller 304, which turns the roll of film in a direction to provide film to the machine. As shown in FIGS. 2 and 2A, the film roll is supported by rollers 38 and 302. The drive roller 304 is also paired with a pinch roller 306, which in combination unwind film from the film roll. Prior to feeding the film into the inverter 40, the film passes a fixed guide roller 320 and travels upwardly to an adjustable guide roller 313. The film subsequently travels downwardly around the dancer roller 314 and upwardly to a fixed guide roller 312. Just prior to being fed into the film inverter 40 the center folded film is separated by a separating bar 315. The drive motor of the present embodiment of the film dispenser is electrically coupled to the system controls 90, thus film dispenser speed may be automatically controlled depending upon the machines desired rate of operation.

An exemplary embodiment of the film dispenser has been described above. However, it should be noted that several powered film unwind systems are known in the art, and the machine 10 of the present invention is designed to be compatible with existing systems. Further, the film 32 referred to throughout this specification is generically termed "polymer" film. It is to be understood that the term "polymer" refers to any heat sealable plastic or thermoplastic or similar film. All such heat sealable films are suitable for use with the wrapping machine of the present invention.

Side Seal Mechanism

Referring now to FIG. 1, the side sealer 50 and the side seal conveyer 60 are shown in relation to the other sub assemblies of the packaging machine. The side sealer may be adjusted vertically with respect to the side seal conveyor by means of adjustment screw 52. Vertical adjustment of the side sealer is desirable in that it is preferred for esthetic reasons that the sealed seam of film on the side of each package be made at approximately the center of the side of the package. In the present embodiment, vertical adjustment is accomplished by mounting the side sealer on a base plate (not shown) and moving the sealer by means of a lead screw (not shown). Other methods of vertical adjustment such as ball bearing screws are known in the art. The side sealer and the side seal conveyor are, as a unit, laterally movable to accommodate packages of varying widths. Such lateral movement may be accomplished by rotating the lateral positioning screw 54. In the present embodiment, the side sealer and conveyor unit are mounted on a linear positioning slide (not shown). Many types of linear positioning slides are suitable and known in the art.

Referring now to FIGS. 6–9, the side seal assembly 50 includes a plurality of shaft mounted front and rear, and inboard and outboard pinch rollers 502A–508B, inboard and outboard pinch belts 512A and 510A respectively, inboard and outboard fixed lower runners 58A and 58B (best seen in the partial cutaway portion of FIG. 9), inboard and outboard floating upper runners 56A and 56B (best seen in the partial cutaway portion of FIG. 9), upper runner biasing arms 514 and biasing springs 516, and a side sealing jaw assembly 517. The sealing jaw assembly comprises a sealing jaw 518, an electrically heated tapered hot wire 520, and an electrically heated hot post 522.

Figure 14:
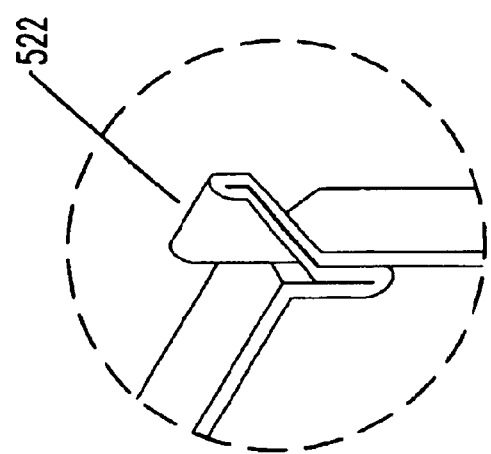

Referring now to FIGS. 13–15, the hot wire 520 and hot post 522 are shown in more detail. The hot wire is formed with a slope angle θ. The slope angle effects the dwell time required to melt the polymer film. In the exemplary embodiment, the hot post is formed as an integral portion of the hot wire.

Referring again to FIGS. 6–9, in general, the side sealer operates as follows. Power from the packaging machine's drive system is supplied to the pinch roller 502B which also functions as a drive roller. By means of a belt and pulley system to be explained later, all four of the pinch rollers are driven at the speed of the side seal conveyer. The film to be sealed 32 enters the side sealer at the front pinch rollers following the direction of film flow as indicated by arrow 22. The film is squeezed between the upper and lower pinch belts corresponding to the inboard and outboard pinch rollers respectively and is subsequently drawn through the side sealer by the these belts. Between the front and rear pinch rollers, uniform pressure is maintained on the pinch belts by means of the upper and lower runners 58A–B and 56A–B. The lower runners 58 are fixed runners within which the pinch belts travel in a guide channel 532. The guide channel is incorporated into each of the lower and upper runners. The upper runners 56 are movable or floating runners which are biased against the pinch belts by means of the biasing arms 514 and biasing springs 516 (FIG. 6). The pinch belts are biased against the film 32 with sufficient force to prevent slippage or lateral or sideways movement of the film relative to the belts. Disposed between the inboard and outboard runners is the side sealing jaw assembly 517. As the two layers of film are drawn through the side sealer, a seal is formed as the layers pass over the tapered hot wire 520 of the sealing jaw assembly 517. The hot wire forms the seal by essentially melting or welding the layers of polymer film together. The "dwell time" or time required for the polymer film to be in contact with the tapered hot wire is primarily a function of the thickness of the film, the thermal conductivity of the film, and the slope angle of the hot wire. The required dwell time for any particular film thickness and composition may be adjusted by: 1) varying the temperature of the tapered hot wire; varying the slope angle of the hot wire; and 3) adjusting the speed of side seal conveyor. Upon reaching the end of the sealing jaw 518, the now sealed film reaches the hot post cutoff 522. The hot post cutoff serves to sever the selvage 38 (FIG. 5) at the line of the seal. The term "selvage" refers to that portion of film extending beyond the seal line, i.e., scrap film. The selvage is wound onto the take-up wheel 302 (FIG. 1) as the packages, now enclosed in a tube of film 36 (FIG. 6), leave the side sealer. In the exemplary embodiment, a take-up wheel is shown for removing selvage, however, other means are known in the art and can be used.

Referring now to FIG. 7, the sealing jaw 518 further includes a radius or semicircular portion 523 over which the tapered hot wire 520 forms a radius portion 521. When the film to be sealed is within this radiused region of the sealing jaw the film absorbs heat from the tapered hot wire and is thus preheated and softened prior to actually making contact with the hot wire. Preheating of the film also reduces drag on the tapered hot wire and results in a better seal than would otherwise be obtainable. In some embodiments, where very precise temperature control is desired, it may be desirable to place a thermocouple on the tapered hot wire.

Again, with reference to FIGS. 6–9, more details of the side sealer and its operation are described. The rear pinch rollers comprise, upper inboard and outboard rollers 502A and 504A respectively, and lower inboard and outboard rollers 502B and 504B respectively. The upper and lower rear rollers are vertically in-line and have a predetermined spacing 524 between the inboard and outboard rollers. The front pinch rollers comprise, upper inboard and outboard rollers 506A and 508A respectively, and lower inboard and outboard rollers 506B and 508B respectively. Like the rear pinch rollers, the upper and lower front pinch rollers are vertically in-line. However, unlike the rear pinch rollers, the inboard and outboard front pinch rollers are longitudinally spaced or offset by a predetermined distance 528. The inboard and outboard front pinch rollers are also laterally spaced a predetermined distance 526. It is particularly important to note that the lateral spacing 524 of the rear pinch rollers is greater than the lateral spacing 526 of the front pinch rollers.

Figure 5:
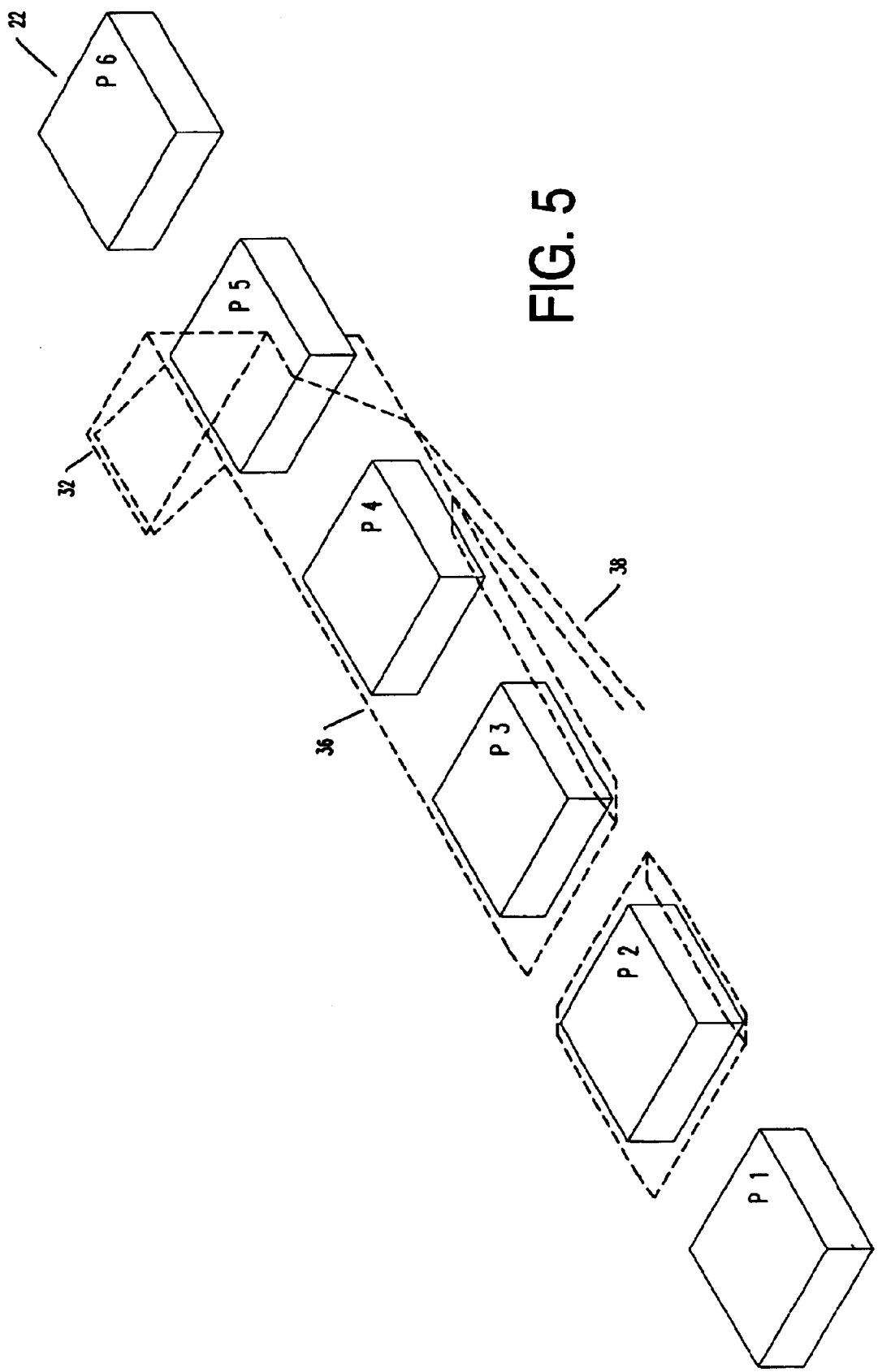
FIG. 5 is a perspective view of the packages of FIG. 4 showing the state of the film sealing procedure corresponding to package flow through the machine.

The front 502A–504B and the rear 506A–508B pinch rollers are coupled by upper and lower and inboard and outboard film pinch belts 512A–B and 510A–B respectively, i.e., the upper inboard belt 512A and the lower inboard belt 512B form one set of matched pinch belts and upper outboard belt 510A and the lower outboard belt 510B form a second set of matched belts. As is best shown in FIG. 8, the outboard set of belts 510A–B is angled away from the inboard set of belts 512A–B by a predetermined angle 530. The offset of the inboard and outboard front pinch rollers and the angled outboard pinch belts provides one of the unique operational advantages of the packaging machine 10 of the present invention. As film to be sealed 32 enters the outboard pair of front pinch rollers, lateral tension is developed in the film. This lateral tension increases as the film enters the inboard front pinch rollers. Once the film has entered the pinch rollers, it is forced to follow the path of the pinch belts. As explained above, due to the pressure maintained on the pinch belts, the film is unable to slip laterally or sideways. Therefore, because the outboard belt set 510 is angled away from the inboard belt set 512, lateral film tension increases as the film travels through the side sealer. In other words, the film is stretched as it passes through the side sealer and the selvage parts readily due to the film tension, as it is severed by the hot post cutoff 522. Further the comparatively wide spacing of the rear pinch rollers allows the selvage to be taken up by the take-up wheel 302 (FIG. 1) with little or no possibility of interference with sealed film tube 36 (FIG. 5).

Side Seal Conveyer

Referring now to FIG. 3, the side seal conveyer 60 is similar in design to the in-feed conveyor 20 and includes an endless belt 64, and a conveyor plate 66. Disposed off-center from the conveyor plate is a drive roller 62. Disposed at each end of the conveyor plate is a rounded nosepiece 68. Like the in-feed conveyor, the rounded nosepiece is used in place of a more conventional idler roller for simplicity. Unlike the in-feed conveyor, the side seal conveyor utilizes two idler or tension rollers 602. As will be explained below, the side seal conveyor drive roller 62 also drives the side sealer 50, thus the side seal drive roller experiences higher load and correspondingly increased drag than that of the in-feed conveyor drive roller. For this reason, a pair of idler rollers is preferred in the side seal conveyor in order maintain appropriate tension in the conveyor belt.

Side Sealer and Conveyor Drive

Referring now to FIG. 2, the side sealer 50 is driven by the power transmission system 100 of the packaging machine 10, as follows. A main drive motor 102 applies power to a pulley 104, which in turn drives a pulley 114, by means of a main drive belt 106. The main drive belt is equipped with an idler pulley 108 to eliminate slack. The pulley 114 is mounted on a power transfer shaft 110. The power transfer shaft drives a pulley 116 which is mounted to and drives the side seal conveyor drive roller 62, via a pulley 120 connected to the drive roller 62 and a belt 123 which couples pulley 116 to pulley 120. The side seal conveyor drive roller rotates the side seal endless conveyor belt 64. The side seal conveyor drive roller 62 further includes a power-take-off ("PTO") pulley 122. PTO pulley 122 is connected to the main side seal drive pulley 530 via a drive belt 121.

Referring now to FIG. 10, it may be seen that the drive pulley 530 is mounted on a common shaft with the lower inboard and outboard rear pinch rollers 502B and 504B respectively, as well as with a lower side gear 534. Lower side gear 534 is meshed with upper side gear 532 which itself is on a common shaft with the upper rear inboard and outboard pinch rollers 502A and 504A respectively. When power is supplied to the lower rear pinch rollers via drive gear 530 and to the upper rear pinch rollers via the side gears, the rear pinch rollers in turn drive the front pinch rollers 506A–508B (FIG. 8) by means of the upper and lower inboard and outboard belt sets 510A–B and 512A–B respectively. Driving of the front rollers causes the film to be sealed 32 (FIGS. 5) to be drawn through the side sealer and whereby the film is sealed and the selvage is trimmed leaving the packages in a sealed tube of film 36, as shown in FIG. 5

Traveling End Seal Mechanism

Referring now to FIG. 1, the traveling end seal mechanism 70 is shown in relation to the other subassemblies of the machine 10. As shown, the end seal mechanism comprises a conveyor assembly 80, a carriage assembly 90 and a cross seal assembly 72.

End Seal Assembly

Referring now to FIG. 11, the details of the end or cross seal assembly 72 and the carriage assembly 90 are shown. The end seal assembly further comprises a housing 74, which contains an upper horizontal shaft 76, a lower horizontal shaft 78, an inboard vertical slide shaft 704 and an outboard vertical slide shaft 702. Mounted between and attached to the vertical slide shafts are an upper cross bar 712 and a lower cross bar 714. The upper and lower cross bars include a linear bearing 710 attached to each end of the bars. In the presently preferred embodiment, the upper and lower cross bars are essentially the same, with the lower cross bar being rotated 180 degrees with respect to the upper bar. The linear bearings 710 slidably couple the upper and lower cross bars to the vertical slide shafts. The upper and lower horizontal shafts are equipped with a side gear 724 at each end of each shaft. Rotatably coupling the upper and lower horizontal shafts, via the gears 724, are actuating chains 706. In the present embodiment, a single inboard chain 706 couples the horizontal shafts at their inboard ends and a single outboard chain 726 couples the horizontal shafts at their outboard ends. With particular reference to the upper cross bar 712, the cross bar is coupled to the front of the inboard actuating chain by means of a tie-plate 708 and is coupled to the front of the outboard actuating chain by another tie-plate 708. The upper cross bar is not coupled to the rear of the actuating chains. The lower cross bar is also coupled to the actuating chains by tie-plates 708. However, unlike the upper cross bar, the lower cross bar is coupled to the rear of the actuating chains and also unlike the upper cross bar, the lower cross bar is not coupled to the front of the chains. In other words, the means of coupling the upper and lower cross bars to the chains via tie-plates is identical, what is different is that the upper cross bar is only coupled to the front of the chains and lower cross bar is only coupled to the rear of the chains.

The use of tie-plates 708 to couple the cross bars to the actuating chains provides for the ability to adjust the opening between the upper and lower cross bars to accommodate packages of various heights. To change the spacing or opening between the cross bars, an operator need only remove the tie-plates and adjust the cross bars to the desired vertical spacing and then reattach the tie-plates.

With continued reference to FIG. 11, the upper cross bar 712 also includes a seal bar 716 which is attached to the upper cross bar via spring loaded guide pins 720. The seal bar includes a hot wire (not shown) for making a cross seal 39, as shown in FIG. 6. The lower cross bar 714 includes a seal base 718, which is attached to the lower cross bar by means of the spring loaded guide pins 720. The spring loaded seal bar 716 and hot wire and the spring loaded seal base create uniform pressure on the polymer film to be sealed when the seal bar and seal base are brought together during the action of the cross seal assembly. It should be noted that although the upper and lower cross bars are described as being attached to the sealing bar and the seal base respectively by means of spring loaded connections, this method of attachment is meant to be exemplary only. The cross sealer will operate effectively with rigid attachments between the upper and lower cross bars and the sealing bar and seal base respectively, and in some situations rigid attachments may be preferred.

The driving force for the end seal assembly is provided by a rotary or pneumatic air cylinder 722. It should be noted that the lower horizontal shaft 78 is an integral component of the rotary air cylinder 722. The rotary air cylinder is capable of both clockwise and counter-clockwise rotation. The rotary air cylinder is actuated in a clockwise direction in response to a first electrical signal generated by a photocell 154 (FIG. 1). An energizing electrical signal is produced by the photocell when a light beam from a light source 155 (FIG. 1) is interrupted by a package moving along the end seal conveyor. When the rotary air cylinder is actuated in the clockwise direction, the upper and lower cross bars 712 and 714 close causing the spring loaded sealing bar 716 to bear against the spring loaded seal base 718, between which lies the tube of film 36 (FIG. 5) to be sealed. Heat from the hot wire in the sealing jaw 716 and pressure produced by the jaw bearing against the sealing pad produces a cross seal 39 (FIG. 5) and simultaneously severs the film at the point of the seal. Counter-clockwise movement of the rotary air cylinder causes the sealing bars and consequently the sealing jaw and pad to open. The rotary air cylinder rotates counterclockwise in response to a second electrical signal generated by a cam operated limit switch 152 (FIG. 2). The operation of this switch will be explained in more detail in the section on the traveling end seal drive to be discussed below. The rotary air cylinder and chain drive system of the cross seal mechanism of the present invention are believed to be unique to film wrapping machines and provide the film wrapping machine 10 of the present invention with a degree of simplicity, adjustability, and speed of operation not previously obtainable in such machines.

Carriage Assembly

Referring now to FIGS. 3, and 11–12, the carriage assembly 90, of the traveling end sealer 70, comprises an upper housing 92 and a lower housing 94. In the exemplary embodiment, the upper housing comprises a base plate 912 and inboard and outboard side plates 914 and 916 respectively. Included within the upper housing are front and rear lower conveyor belt rollers 902 and 904 and front and rear upper conveyor belt rollers 906 and 908. The upper housing further includes an upper cross member 910 which provides lateral rigidity to the side plates of the upper housing. Attached to the upper housing is a lower housing 94. Enclosed within the lower housing is linear slide carriage 920, which in combination with a slide ram 918 forms a complete linear slide bearing assembly 96. The ends of the slide ram are fixed to the support structure (not shown) of the high speed wrapping machine 10. The lower housing also includes a fitting 98 for attachment of a first pushrod 126. In operation the mated carriage and cross seal assemblies reciprocate back and forth over the ram 918 of the linear bearing 96 via reciprocating force applied by the first pushrod 126 to the linear bearing carriage 920. In the exemplary embodiment, the lower housing serves to provide a connection between the linear bearing carriage 920 and the upper housing 92 of the carriage assembly 90. The lower housing also provides a connection point for the first pushrod 126. However, those skilled in the art will realize that the lower housing may take many forms and may be dispensed with entirely as the provisions for connection to the carriage assembly 90 and for attachment to the first pushrod 126 may be incorporated directly into the linear bearing carriage 920.

Referring again to FIG. 11, in many situations it is desirable to be able to adjust the height of end sealer 72 such that the cross or end seals are approximately centered with respect to the ends of the packages. To accomplish such adjustment, it is necessary to be able to raise or lower the end sealer with respect to the center line of the packages. In the packaging machine of the present invention 10, this is accomplished by indexably mating the end sealer to the carriage assembly 90 as follows. The carriage assembly is mated to the end seal assembly by means of holes 915 in the carriage assembly side plates 914 and 916, which index with matching holes 715 in the housing 74 of the end seal assembly. The means of attachment may be bolts, ball-lock pins, or any other suitable fasteners. If more precise height adjustments are required, those skilled in the art will realize that the indexing method described above may be replaced with simple lead screws, ball screws, or any other suitable linear positioning device.

Those skilled in the art will realize that simplifications may be made to the exemplary embodiment described above without departing from the scope of the invention. For example the sealing bar 716 and the sealing base 718 may be eliminated and the hot wire, or a hot knife, may be incorporated directly in either one of the cross bars 712 and 714. In addition, the end seal assembly 72 and the carriage assembly 90 may be constructed as a single unit. This may be readily accomplished by incorporating the features of the carriage assembly directly into the end seal assembly housing or frame 74. Further, the sealing bars have been described as closing during clockwise rotation of the rotary air cylinder 722 and as opening during counter-clockwise rotation of the rotary air cylinder. However, the end sealer may be easily constructed so that the sealing bars close during counter-clockwise rotation of the rotary air cylinder and open during clockwise rotation of the rotary air cylinder. Other simplifications are also possible.

Traveling End Seal Conveyor and Drive

Referring now to FIGS. 2 and 3, and with particular reference to FIG. 3, the traveling end seal conveyor 80 includes a conveyor belt 81, which begins at a drive roller 84 and follows the direction of belt travel shown by arrow 804. The belt path is as follows. From the drive roller 84, the belt travels upwards past a tension roller 802 to an idler roller 82. From the idler roller 82 the belt travels in a flat plane, coplaner with the side seal conveyor 60, to the idler roller 906 mounted on the carriage assembly 90. The belt proceeds to drop downwards and then upwards to form a U-shape around the cross sealer 72 following the idler rollers on the carriage assembly, which are 902, 904, and 908 respectively. From the idler roller 908 to idler roller 88, the belt is flat and coplaner with the side seal and the in-feed conveyors, 60 and 20, of the packaging machine 10. At idler roller 88, the packages may optionally be passed into a heat shrinking tunnel or other machine if desired. From the idler roller 88 the path of the belt continues back to the drive roller via another idler roller 86. It will be noted that because idler rollers 902, 906, 904, and 908, are mounted on the carriage assembly 90, the "U" formed by the belt will reciprocate back and forth traveling with the carriage assembly 90. Further, because the aforementioned idler rollers are positioned on the carriage assembly, there is no possibility of the conveyor belt interfering with the operation of the cross sealer 72, which is also fixed to the carriage assembly.

Referring now to FIG. 2, the drive system for the conveyor belt of the traveling end sealer 70 is an extension of the system used to drive the side seal conveyer 60. The main drive motor 102 applies power to the pulley 104, which in turn drives the pulley 114, by means of the main drive belt 106. The main drive belt is equipped with the idler pulley 108 to eliminate slack. The pulley 114 is mounted on the power transfer shaft 110. The power transfer shaft drives a PTO pulley 112 which in turn drives the traveling end sealer conveyor belt drive roller 84 via a pulley 128 and belt 130. The pulley 128 is mounted on the shaft of the drive roller 84. Belt 130 is tensioned by a tension pulley 132.

Carriage Assembly Drive

Referring now to FIG. 2, the reciprocating operation of the carriage assembly 90 is explained below. The drive motor 102 of the power transmission system 100 operates continuously to drive the side sealer 50 and the side seal and traveling end seal conveyor systems 60 and 80 as explained previously. The same motor 102 is also used to provide forward motion of the carriage assembly. The motor 102 drives a pulley 132, which in turn drives a pulley 156, and a belt 134. Tension is maintained in the belt 134 via a tension pulley 136. The pulley 156 is on a common shaft with a variable input pulley 160 which in combination with a mating output pulley 162, and belt coupling the pulleys, forms part of a continuously variable transmission 138. The reduction ratio of the continuously variable transmission is controlled by a lever 158. Essentially, for any given input pulley speed the continuously variable transmission allows an operator to selectively control the output pulley speed. Therefore, the speed of the carriage assembly may be synchronized with the conveyor systems.

Continuously variable transmissions utilizing variable pulleys are known to those skilled in transmission design. Variable pulleys of the type used to make the continuously variable transmission incorporated in the film wrapping machine of the present invention are available from Speed Selector Corporation.

Power from the output pulley 162 of the continuously variable transmission 138 is used to drive the input pulley 160 of an electromagnetic clutch 142. All components of the carriage drive up to the input pulley 160 of the electromagnetic clutch are continuously driven via the drive motor 102. All drive system components subsequent to the clutch experience intermittent operation.

An electromagnetic or partial revolution clutch is a type of clutch that will make a single or partial revolution upon being energized and will automatically de-energize after the single or partial revolution is complete. The partial revolution clutch 142 used in the present invention revolves about 110 degrees before being de-energized by the second electrical signal triggered by the limit switch 152. Such clutches are available commercially. Borg-Warner Corporation of is one such source.

The partial revolution clutch 142 is energized to make a mechanical connection between the input pulley of the clutch 160 and a corresponding output pulley 164 in response to the first electrical signal from the photocell 154. As stated previously, an energizing electrical signal is produced by the photocell when the light beam from the light source 155 is interrupted by a package moving along the end seal conveyor. Once a package breaks the light beam, an electrical signal from the photocell energizes the clutch. (It should be noted that the photocell simultaneously energizes the clutch and the rotary air cylinder 722 (FIG. 11)). The clutch subsequently rotates 110 degrees counterclockwise thereby rotating a bell crank 148, via a pulley 146 and the output pulley 164, which are coupled by a drive belt 166. The drive belt 166 is tensioned by a tension pulley 168. Counterclockwise rotation of the partial revolution clutch produces counter clockwise rotation of the bell crank 148, which in turn pushes the first pushrod 126 forward, causing the traveling end sealer 70 to move forward.

The bell crank 148 and the pulley 146 are mounted on a shaft 144, which further includes a cam 150. Rotation of the shaft 144 in response to rotation of the partial revolution clutch causes the cam to rotate and actuate the limit switch 152. Once the limit switch is actuated it produces the second electrical signal which activates a linear or pneumatic air cylinder 170 which retracts the bell crank via a second pushrod 172. Retraction of the bell crank in turn causes the traveling end sealer 70 to be retracted or pulled backwards to its original position. The second electrical signal produced by the limit switch simultaneously de-energizes the partial revolution clutch. The clutch remains de-energized until a subsequent package triggers the photocell 154.

Relationship of Cross Seal Motion to Carriage Motion

Referring now to FIGS. 2 and 11, in the wrapping machine of the present invention 10, the cross bars 712 and 714 of the cross seal mechanism 72 are caused to close and open in synchronism with the reciprocating longitudinal motion of the carriage assembly 90. This process occurs as follows. Once a package breaks the light beam to the photocell 154, the first electrical signal actuates the rotary air cylinder 722 in a clockwise direction causing the sealing bars to close on the film to be sealed. Simultaneously, the first electrical signal from the photocell causes the partial revolution clutch 142 to actuate, which thereby drives the carriage assembly 90 forward. Since the end seal assembly is mounted to the carriage assembly, the now closed jaws travel forward with the carriage, which is synchronized to move at about the same velocity as the film enclosed packages. As the partial revolution clutch completes its 110 degrees of revolution, forward motion of the carriage assembly stops and the cam 150, which is mechanically linked to the clutch as described in the section on the carriage assembly drive, actuates the limit switch 152. The second electrical signal generated by the limit switch actuates both the rotary air cylinder of the cross seal assembly and the linear air cylinder 170 of the carriage drive and de-energizes the clutch. The rotary air cylinder is actuated in the counter-clockwise direction thereby causing the cross seal bars to open, releasing the now sealed and severed film, and the linear air cylinder is caused to retract thereby moving the carriage assembly back to its initial starting or rest position. This cycle of operation is repeated each time a package breaks the light beam of the photocell.

CONCLUSION

It is apparent from the foregoing description of the high speed wrapping machine, where reference is made to the control of pneumatic or air cylinders actuating certain devices such as the cross sealer and the carriage assembly, where reference is made to photoelectric cells actuating the air cylinders and an electromagnetic clutch, and where reference is made to the motor controlled feed of film and the driving of various conveyors and the like, that electrical and electronic controls for such devices may be assembled from control devices known to those skilled in the art. Since the function of the various motors, air cylinders, clutch, photocell, and the like have been described in detail, it is believed that those skilled in the art will not need a detailed description of the electrical and pneumatic circuitry whereby these elements are interconnected to practice this invention.

Also, a photocell has been used to trigger the operation of the cross sealer and carriage assembly in the exemplary embodiment because it has been found that this form of control is most convenient when packages are to be wrapped which change in length from run to run. However, limit switches or other types of mechanical and electro-mechanical switches may also be used. In the event of a single production machine, however, such as machines wrapping video cassettes, it should be understood that the end sealer may be linked to the main drive of the machine and synchronized with the inflow of video cassettes to the machine without requiring photocell initiation of the end sealer.

While only the presently preferred embodiment has been described in detail, as will be apparent to those skilled in the art, modifications and improvements maybe made to the device disclosed herein without departing from the scope of the invention. Accordingly, it is not intended that the invention be limited except as by the appended claims.

What is claimed is:

1. A side sealer for sealing together the free edges of adjacent layers of heat sealable plastic film on one side of film-surrounded packages, comprising:

means for driving an inboard pair of upper and lower longitudinally extending pinch belts, and an outboard pair of upper and lower longitudinally extending pinch belts, wherein the belts grip and pull film to be sealed through the side sealer;

the outboard pair of belts being spaced laterally from the inboard belts and being offset at an angle to the inboard belts such that the direction of increasing lateral separation of the inboard and outboard belts corresponds to the flow of film through the side sealer;

a sealing jaw including a hot wire and a hot post disposed intermediate the inboard and outboard belt, wherein the free edges of the film moving through the side sealer are sealed as they pass over the jaw; and wherein, the film gripped and pulled longitudinally by the angularly offset inboard and outboard belts is also tensioned laterally by the angled belts such that excess film is severed and separated easily from the sealed film upon contact with the hot post.

2. The side sealer of claim 1, wherein the hot wire is of tapered cross section.

3. The side sealer of claim 1, wherein the hot post cutoff is integrally formed with the tapered hot wire.

4. The side sealer of claim 1, wherein the one of the inboard or outboard pairs of belts is longitudinally offset at one end from the other pair.

5. A reciprocating end sealer for making transverse seals in a tube of film containing spaced packages while the film and packages are traveling longitudinally through the end sealer, the end sealer comprising:

a conveyer for transporting packages enclosed in a tube of film at a substantially continuous velocity through the end sealer;

sealing means having an initial position for making seals, wherein the sealing means forms cross seals in the film between the spaced packages; and reciprocating means for moving the sealing means at substantially the same speed as the film moving on the conveyer for the duration of the sealing process, wherein when the sealing process is complete, the reciprocating means returns the sealing means to the initial position in preparation for forming a new seal, at a speed substantially faster than that of the conveyer; and wherein the conveyor interacts with the reciprocating means such that a top portion of the conveyor travels with the sealing means in response to the reciprocating means.

6. An end sealer for providing a seal transverse to a tube of film containing spaced packages while the film and packages are traveling longitudinally at a substantially continuous velocity, the end seal severing the film tube between adjacent packages to provide individually sealed packages, the end sealer comprising:

upper and lower horizontal shafts rotatably attached to a frame at the top and bottom of the frame respectively, wherein the upper and lower horizontal shafts are coupled via a drive chain to rotate in unison;

means for producing clockwise and counter-clockwise rotation of at least one of the horizontal shafts;

upper and lower sealing bars wherein one of the sealing bars includes a hot wire for sealing and severing the film between the film enclosed packages, and further wherein the sealing bars are slidably coupled at each end to vertical slide shafts, wherein the slide shafts are attached to the frame;

means for connecting the sealing bars to the drive chain such that the sealing bars move vertically towards each other to cross seal and sever the film between packages in response to clockwise rotation of the horizontal shafts and vertically away from each other in response to counter-clockwise rotation of the horizontal shafts.

7. The end sealer of claim 6, wherein the means for producing clockwise and counter-clockwise rotation of at least one of the horizontal shafts is a rotary cylinder.

8. A traveling end sealer drive system for causing the end sealer of claim 7 to move at approximately the same speed as the film to be sealed while making the end seals, the drive system thereby allowing for continuous operation of the end sealer, the system comprising:

a base and slide assembly for attachment to an end sealer, the base and slide assembly allowing the end sealer to undergo reciprocating motion;

a main drive motor, the drive motor having at least one output and operating continuously at various speeds in response to signals from the control system;

one of the motor outputs being coupled to a variable speed transmission;

a partial revolution clutch, the clutch having an input and an output shaft where the input shaft may be connected to the output shaft in response to an electrical signal, the clutch being operably coupled to the variable speed transmission;

the variable speed transmission being operable to differentiate the power supplied by the drive motor between motor outputs;

a bell crank and a cam mounted on a common shaft;

means for connecting the bellcrank and cam common shaft with the partial revolution clutch such that the bellcrank and cam will rotate in response to rotation of the output shaft of the clutch;

the bell crank being connected via a first pushrod to the traveling end sealer and further being connected via a second pushrod to a linear cylinder;

the cam located proximate a limit switch such that a single revolution of the cam will actuate the switch;

a means for providing a first electrical signal in response to a package moving on the end sealer conveyor belt;

the rotary cylinder and the partial revolution clutch being simultaneously responsive to the first electrical signal;

the rotary cylinder being responsive to the first electrical signal to rotate clockwise causing the sealing bars to close;

the partial revolution clutch being responsive to the first electrical signal to couple its output shaft to its input shaft and to rotate the output shaft through a partial revolution;

the partial revolution clutch output shaft's partial revolution causing the end sealer to move forward to the limit of its forward travel, at substantially the same velocity as the end seal conveyor belt, by moving the bell crank forward;

the partial revolution clutch output shaft's partial revolution causing the cam to actuate the limit switch at the end of the partial revolution, wherein the limit switch generates a second electrical signal, wherein the second electrical signal decouples the partial revolution clutch and activates the rotary cylinder in a counter-clockwise direction and further activates the linear cylinder;

the linear cylinder responsive to the second electrical signal acting to pull the traveling end sealer back to its rest position via the bellcrank and the second pushrod; and the rotary cylinder responsive to the second electrical signal rotating counter-clockwise causing the sealing bars to open; and driving means for driving the in-feed, side seal, and end seal conveyors, the driving means connected to one of the motor outputs.

9. The drive system of claim 8, wherein the slide and base assembly comprises a linear bearing, wherein the linear bearing includes a movable bearing carriage and a slide, the movable bearing carriage being attached to the base of the frame, the slide being slidably mated to the movable bearing carriage, the ends of the slide being attached to the support structure of the wrapping machine, wherein the end sealer is movable back and forth over the slide.

10. The end sealer of claim 6, wherein the sealing bars move vertically towards each other to cross seal and sever the film between packages in response to counter-clockwise rotation of the horizontal shafts and vertically away from each other in response to clockwise rotation of the horizontal shafts.

11. A side sealer for sealing together the free edges of adjacent layers of heat sealable plastic film on one side of film-surrounded packages flowing in a longitudinal direction and for severing selvage from the surrounded packages, the side sealer comprising:

an inboard pair and an outboard pair of upper and lower laterally spaced, longitudinally extending belts, each belt in a vertical plane, each belt of the inboard and outboard pairs being vertically aligned, with the outboard pair being of greater length then the inboard pair such that the outboard pair is longitudinally offset from the inboard pair, the outboard pair also being laterally offset at an angle to the inboard pair such that the direction of increasing lateral separation of the inboard and outboard pairs corresponds to the flow of packages through the machine, each of the belts being supported by at least a pair of pinch rollers;

means for driving at least one of the rollers and its supported belt;

a pair of fixed inboard and outboard lower runners, wherein the inboard and outboard lower runners are disposed between the inboard and outboard lower belts respectively, the inboard and outboard lower runners each including a guide channel within which an upper portion of the inboard and outboard lower belts travel respectively;

a pair of floating inboard and outboard upper runners, wherein the inboard and outboard upper runners are disposed between the outboard and inboard upper belts respectively, each upper runner including a guide channel within which a lower portion of the inboard and outboard upper belts travel respectively;

means for biasing the upper runners against the lower runners, wherein the lower portions of the upper belts are pressed against the upper portions of the lower belts;

a sealing jaw including a tapered hot wire and a hot post affixed to the jaw, wherein the jaw is disposed intermediate the inboard and outboard runners and the hot wire is substantially coplanar with a plane formed by the interface of the upper portions of the lower belts and the lower portions of the upper belts and the hot post extends above the plane;

wherein, the edges of the adjacent layers of continuously moving film are input to the side sealer at the space between the upper and lower, inboard and outboard, belts of the side sealer, at the end of the side sealer containing the longitudinally offset belts, the film being grasped by the belts and moved longitudinally by the belts, the film portion between the inboard and outboard pairs of belts being sealed upon sliding over the length of the hot wire affixed to the sealing jaw disposed between the inboard and outboard pairs of belts, thereby forming a continuous longitudinal seal when the upper and lower jaws are biased together; and wherein, in addition to being pulled longitudinally, the film grasped by the laterally offset angled belts is tensioned laterally such that the selvage separates easily upon contact with the hot post.

12. An automatic high speed film wrapping machine for wrapping packages in plastic film in which the flow of products through the machine is substantially continuous and in a straight line comprising:

an in-feed conveyor for providing packages disposed within center folded film to the wrapping machine, wherein the free edges of the film are on one side of the packages;

a side seal conveyor positioned in-line with the in-feed conveyer and adapted to receive the film enclosed packages from the in-feed conveyor;

a side sealer for sealing the free edges of the center folded film while the packages are running continuously on the side seal conveyor to form a tube of film containing the packages, the side sealer sealing the film with a tapered hot wire and further severing selvage from the tube of film with a hot post cutoff;

an end seal conveyor, the conveyor adapted to transport the tube of film enclosed packages to a traveling end sealer;

the traveling end sealer providing a seal transverse to the tube of uniformly spaced packages while the packages are traveling through the end sealer at a substantially continuous velocity, the end seal severing the film tube between adjacent products to provide individually sealed packages at the output of the end sealer;

the traveling end sealer comprising:

a conveyer for transporting packages enclosed in a tube of film at a substantially continuous velocity through the end sealer;

sealing means having an initial position for making seals, wherein the sealing means forms cross seals in the film between the spaced packages; and reciprocating means for moving the sealing means at substantially the same speed as the film moving on the conveyer for the duration of the sealing process, wherein when the sealing process is complete, the reciprocating means returns the sealing means to the initial position in preparation for forming a new seal, at a speed substantially faster than that of the conveyer means; and wherein the conveyor interacts with the reciprocating means such that a top portion of the conveyor travels with the sealing means in response to the reciprocating means.

13. An automatic high speed film wrapping machine for wrapping packages in plastic film in which the flow of products through the machine is substantially continuous and in a straight line comprising:

an in-feed conveyor for providing packages to the wrapping machine;

a folded film inverter, wherein the film inverter is disposed on the in-feed conveyor such that packages are inserted into the inverter by the in-feed conveyer and are surrounded by the film in the inverter, the inverter providing the free edges of the film at one side of the packages;

a film dispenser for supplying folded film to the inverter;

a side seal conveyor, adjacent to the film inverter for supporting the film surrounded packages and adapted to receive the packages from the inverter;

a control system, the system being operable to selectively adjust the speed of the side seal conveyor relative to the in-feed conveyor to provide for a speed differential between the in-feed conveyor and the side seal conveyor, such that the side seal conveyor may run faster than the in-feed conveyor, wherein the spacing between the packages may be increased or decreased as the speed differential between the conveyors is increased or decreased;

a side sealer, the side sealer being adapted to receive the film covered products from the film inverter via the side seal conveyor, wherein the side sealer seals the free edges while the packages are running continuously on the side seal conveyor to form a tube of film containing the packages and severing selvage from the tube of film;

an end seal conveyor, the conveyor adapted to transport the tube of film enclosed packages to a traveling end sealer; the traveling end sealer providing a seal transverse to the tube of uniformly spaced packages while the packages are traveling through the end sealer at a substantially continuous velocity, the end seal severing the film tube between adjacent products to provide individually sealed packages at the output of the end sealer;

the traveling end sealer comprising:
  upper and lower horizontal shafts rotatably attached to a frame at the top and bottom of the frame respectively;
  means for coupling the upper and lower horizontal shafts such that the upper and lower shafts rotate in unison;
  a pneumatic rotary cylinder for producing clockwise and counter-clockwise rotation of at least one of the horizontal shafts;
  upper and lower sealing bars wherein one of the sealing bars includes a hot wire for sealing and severing the film between the film enclosed packages;
  the sealing bars being slidably coupled at each end to vertical slide shafts, wherein the slide shafts are attached to the frame;
  means for connecting the sealing bars to the horizontal shaft coupling means such that the sealing bars move vertically towards each other to cross seal and sever the film between packages in response to clockwise rotation of the horizontal shafts and vertically away from each other in response to counter-clockwise rotation of the horizontal shafts;
  a linear bearing, wherein the linear bearing comprises a movable bearing carriage and a slide, the movable bearing carriage being attached to the base of the frame, the slide being slidably mated to the movable bearing carriage, the ends of the slide being attached to the support structure of the wrapping machine, wherein the end sealer is movable back and forth over the slide;
  a traveling end sealer drive system comprising:
    a main drive motor, the drive motor having at least one output and operating continuously at various speeds in response to signals from the control system;
    one of the motor outputs being coupled to a variable speed transmission;
    a partial revolution clutch, the clutch having an input and an output shaft where the input shaft may be connected to the output shaft in response to an electrical signal, the clutch being operably coupled to the variable speed transmission;
    the variable speed transmission being operable to differentiate the power supplied by the drive motor between motor outputs;
    a bell crank and a cam mounted on a common shaft;
    means for connecting the bellcrank and cam common shaft with the partial revolution clutch such that the bellcrank and cam will rotate in response to rotation of the output shaft of the clutch;
    the bell crank being connected via a first pushrod to the traveling end sealer and further being connected via a second pushrod to a linear pneumatic cylinder;
    the cam located proximate a limit switch such that a single revolution of the cam will actuate the switch;
    a means for providing a first electrical signal to the control system in response to a package moving on the end sealer conveyor belt;
    the rotary pneumatic cylinder and the partial revolution clutch being simultaneously responsive to the first electrical signal via the control system;
    the rotary pneumatic cylinder being responsive to the first electrical signal to rotate clockwise causing the sealing bars to close;
    the partial revolution clutch being responsive to the first electrical signal to couple its output shaft to its input shaft and to rotate the output shaft through a partial revolution;
    the partial revolution clutch output shaft's partial revolution causing the end sealer to move forward to the limit of its forward travel, at substantially the same velocity as the end seal conveyor belt, by moving the bell crank forward;
    the partial revolution clutch output shaft's partial revolution causing the cam to actuate the limit switch at the end of the partial revolution, wherein the limit switch generates a second electrical signal, wherein the control system being responsive to the second electrical signal decouples the partial revolution clutch and activates the rotary pneumatic cylinder in a counter-clockwise direction and further activates the linear pneumatic cylinder;
    the linear pneumatic cylinder acting to pull the traveling end sealer back to its rest position via the bellcrank and the second pushrod; and
    the rotary pneumatic cylinder rotating counter-clockwise causing the sealing bars to open.
driving means for driving the in-feed, side seal, and end seal conveyors, the driving means connected to one of the motor outputs.

14. The automatic high speed film wrapping machine of claim 13, wherein the in-feed conveyor comprises:
  a conveyor plate with a rounded nosepiece at one end and a drive roller at the other end, the conveyor plate, rounded nosepiece, and drive roller being enclosed by a conveyor belt where the conveyor belt is free to rotate around the conveyor plate, nosepiece, and drive roller upon being driven by the drive roller;
  the in-feed conveyor further comprising at least one idler roller to tension the conveyor belt and at least one drive motor and means for coupling the drive motor to the drive roller.

15. The automatic high speed film wrapping machine of claim 13, wherein the control system is selectively adjustable to provide for a speed differential between the in-feed conveyor and the side seal conveyor such that side seal conveyor runs faster than the in-feed conveyor, wherein the spacing between packages may increased or decreased as the speed differential between the conveyors is increased or decreased.

16. The automatic high speed film wrapping machine of claim 13, wherein the means for providing a first electrical signal to the control system in response to a package moving on the end sealer conveyor belt is a photo-electric cell.

17. The automatic high speed film wrapping machine of claim 13, wherein the carriage assembly is indexably mated to the end sealer so that the vertical height of the end sealer may be adjusted in order to form an end seal at about the center of the packages to be sealed.

18. The automatic high speed film wrapping machine of claim 13, wherein the sealing bars are indexably attached to the drive chains such that the spacing between the bars may be adjusted to accommodate packages of varying heights.

* * * * *